Patented July 14, 1936

2,047,514

UNITED STATES PATENT OFFICE 2,047,514

AZO DYESTUFFS INSOLUBLE IN WATER AND FIBER DYED THEREWITH

Leopold Laska and Arthur Zitscher, Offenbach-on-the-Main, Germany, assignors to General Aniline Works, Inc., New York, N. Y., a corporation of Delaware No Drawing. Application August 7, 1931, Serial No. 555,861. In Germany August 15, 1930

13 Claims. (Cl. 260—76)

Our present invention relates to new azo dyestuffs insoluble in water and fiber dyed therewith.

These dyestuffs contain as typical component once or twice an arylamide of the following formula:

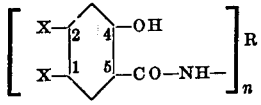

wherein the X's mean methyl groups one of which may be replaced by a chlorine atom, $n$ means the number 1 or 2 and R a benzene, naphthalene or carbazole nucleus which may be substituted by alkyl, alkoxy, halogen or nitro groups. In the molecule of our new dyestuffs one or two of the aforesaid arylamides are attached by means of azo groups to a benzene, naphthalene or anthraquinone nucleus which may contain alkyl, alkoxy, aryloxy, halogen, nitro- or arylazo-groups.

In consequence of the fact that the 1,2- substituted 4-hydroxy-benzene radical of the above formula may be once or twice attached to the radical R by means of CO—NH—groups (which groups are named throughout this specification "carbonyl-amino") and that it may be once or twice attached by means of azo groups to the aforesaid radicals of the benzene, napthalene or anthraquinone series, a general formula covering all the dyestuffs forming the subject of our present invention cannot be given.

The dyestuffs are prepared by combining diazo, tetrazo or diazo azo compounds of the benzene, napthalene or anthraquinone series which may contain alkyl, alkoxy, aryloxy, halogen or nitro-groups as substituents, with arylamides of the above formula.

The dyestuffs may be produced in substance and used for making color lakes or they may be prepared on fibers. As fibers suitable for the production of these dyestuffs thereon may be named: cotton, wool, native and regenerated cellulose (viscose), ethers and esters of cellulose (acetate silk).

When these dyestuffs are prepared on the fiber according to the ice-color method an intermediate drying operation may be dispensed with on account of the affinity of the arylamides to the fibers. Thereby mainly brown dyeings are produced, ranging to brownish black and black according to the diazo compound used, especially suitable for the batic style of dyeing.

The 1,2-substituted-4-hydroxy-benezene-5-carbonyl-amino-aryls used as combining components in the production of our new dyestuffs may be prepared by condensing the 1,2-substituted 4-hydroxy-benzene-5-carboxylic acids (see Ber. d. deutschen chem. Ges., vol. 26, page 1851; vol. 11, page 30; vol. 12, page 435; U. S. Patent No. 1,846,-127) with a mono- or diamine of benzene, naphthalene or carbazole series the nuclei of which may be substituted by alkyl, alkoxy, halogen or nitro-groups.

In order to further illustrate our invention, the following examples are given. We wish it, however, to be understood that we are not limited to the particular products or reaction conditions mentioned therein.

Example 1

Well boiled and dried cotton yarn is impregnated with a solution containing per liter 20 grs. of 2 - (4-hydroxy-1,2-dimethyl-benzene - 5 - carbonyl) amino-napthalene, 30 cc. of caustic soda lye of 34° Bé., 30 cc. of Turkey red oil and 20 grs. of common salt. The goods are well wrung out and developed with a solution containing per liter the diazo compound of 1.62 grs. of 2,5-dichloro-1-amino-benzene and being neutralized with sodium bicarbonate. Then they are rinsed and soaped at the boil.

In this manner a brown dyeing of a good fastness to light is obtained. The dyestuff thus produced on the fiber corresponds to the formula:

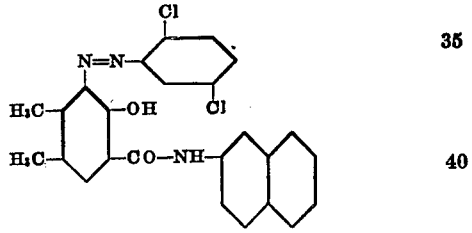

Example 2

Cotton goods which are previously treated in the customary manner are padded with a solution containing per liter 20 grs. of 1-(4-hydroxy-1,2-dimethyl - benzene - 5 - carbonyl) amino - 2,5 - dimethoxy-benzene, 30 cc. of a caustic soda solution of 34° Bé., 30 cc. of Turkey red oil and mixed with 20 grs. of common salt. After being squeezed out the goods are developed with a solution containing per liter the diazo compound of 1.68 grs. of 4-nitro-2-methoxy-1-amino-benzene and being neutralized with sodium bicarbonate, then rinsed and soaped at the boil.

In this manner a dark brown dyeing of a very good fastness to light is obtained. The dyestuff thus produced on the fiber corresponds to the formula:

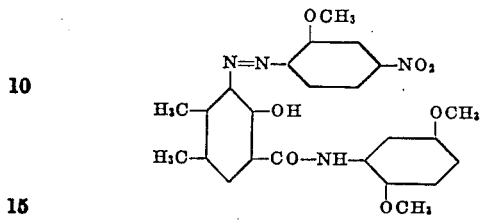

By using the diazo compound of 3,2'-dimethyl-4-amino-azo-benzene a dark brown, by using that of 4-nitro-2-methyl-1-amino-benzene a greyish brown dyeing is obtained.

*Example 3*

Acetate-silk is impregnated with a solution containing per liter 0.25 grs. of 4,4'-diamino-3,3'-dimethoxy-diphenyl and 1 cc. of hydrochloric acid of 20° Bé. and, after rinsing, treated in the customary manner in a bath containing nitrite and hydrochloric acid. Then the goods are again rinsed and developed with a solution containing per liter 2 grs. of (4-hydroxy-1,2-dimethyl-benzene-5-carbonyl)-amino-benzene and 0.8 grs. of calcined sodium carbonate.

In this manner a dark brown dyeing is obtained. The dyestuff thus produced on the fiber corresponds to the formula:

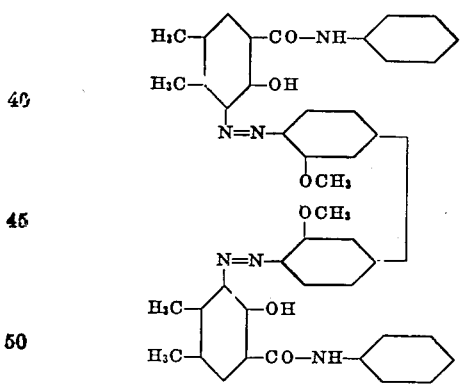

By replacing (4-hydroxy-1,2-dimethyl-benzene-5-carbonyl)-amino-benzene by 1-(4-hydroxy-1,2-dimethyl-benzene-5-carbonyl)amino-2,5-dimethoxy-benzene there are obtained on acetate-silk by means of the tetrazo compounds or tetrazo-azo-compounds of:

| | Shades |
|---|---|
| 4,4'-diamino-3,3'-dimethoxy-diphenyl | Yellowish brown |
| 4,4'-diamino-3,3'-dichloro-diphenyl | Yellowish brown |
| 3,2',5'-trimethoxy-4,4'-diamino-azobenzene | Reddish brown |
| 2,5'-dimethoxy-2'-methyl-4,4'-diamino-azobenzene | Brown |
| 2,2',5'-trimethoxy-4,4'-diamino-azobenzene | Reddish brown | or by means of the diazo-azo-compound of:

| | Shades |
|---|---|
| 3,2'-dimethoxy-4-amino-azobenzene | Yellowish brown |

*Example 4*

Viscose is padded for half an hour in a bath containing per liter 10 grs. of 1-(4-hydroxy-1,2-dimethyl-benzene - 5 - carbonyl) amino - 2,4 - dimethyl-benzene, 20 cc. of a caustic soda solution of 34° Bé. and 20 cc. of Turkey red oil, 10 grs. of common salt being gradually added. Then the goods are well centrifuged and treated in a solution containing per liter the diazo compound of 2.8 grs. of 4-benzoylamino-3-methoxy-6-chloro-1-amino-benzene and being freed from the excess of mineral acid by the addition of sodium acetate.

After rinsing and soaping a yellowish brown dyeing is produced. The dyestuff thus produced on the fiber corresponds to the formula:

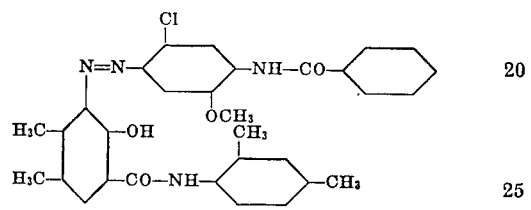

By developing the impregnated goods with the diazo compound of 2'-ethoxy-benzene-azo-4-amino-naphthalene a blackish brown dyeing is obtained.

Yellowish brown dyeings on wool are produced by means of 1-(4-hydroxy-1,2-dimethyl-benzene-5-carbonyl)amino-2-methoxy-benzene or 1-(4-hydroxy - 1, 2 - dimethyl - benzene - 5 - carbonyl) amino-3-methyl-benzene and the diazo compound of 3-chloro-1-amino-benzene.

The following table shows the shades of some other dyestuffs of this kind.

1-(4-hydroxy-1,2-dimethyl-benzene-5-carbonyl) amino-3-chloro-benzene yields with the diazo compound of:

| | Shades |
|---|---|
| 2,5-dichloro-1-amino-benzene | Brown |
| 4-chloro-2-methyl-1-amino-benzene | Reddish brown |
| 3,2'-dimethyl-4-amino-azo-benzene | Dark brown |
| 4-amino-4'-methoxy-diphenylamine | Brown |

1-(4-hydroxy-1,2-dimethyl-benzene-5-carbonyl) amino-2-methoxy-5-chloro-benzene yields with the diazo compound of:

| | Shades |
|---|---|
| 2,5-dichloro-1-amino-benzene | Yellowish brown |
| 4-chloro-2-methyl-1-amino-benzene | Yellowish brown |
| 2-nitro-1-amino-benzene | Greyish brown |
| 2-nitro-4-methyl-1-amino-benzene | Greyish brown |
| 1-amino-anthraquinone | Reddish brown |
| 4'-nitro-2,5-dimethoxy-4-amino-azo-benzene | Brownish black |

1-(4-hydroxy-1,2-dimethyl-benzene-5-carbonyl) amino-2-methoxy-5-nitro-benzene yields with the diazo compound of:

| | Shades |
|---|---|
| 4-nitro-2-methyl-1-amino-benzene | Greyish brown |
| 4-nitro-2-methoxy-1-amino-benzene | Greyish brown |
| 3,2'-dimethyl-4-amino-azo-benzene | Dark brown |

1-(4-hydroxy-1,2-dimethyl-benzene-5-carbonyl) amino-naphthalene yields with the diazo compound of:

| | Shades |
|---|---|
| 2,5-dichloro-1-amino-benzene | Brown |
| 4-chloro-2-methyl-1-amino-benzene | Reddish brown |
| 5-chloro-2-phenoxy-1-amino-benzene | Brown |
| 2-nitro-4-methyl-1-amino-benzene | Blackish brown |
| 4-nitro-2-methyl-1-amino-benzene | Violetish brown |
| 4-nitro-2-methoxy-1-amino-benzene | Brownish black |
| 3,2'-dimethyl-4-amino-azo-benzene | Dark brown |

2-(4-hydroxy-1,2-dimethyl-benzene-5-carbonyl) amino-naphthalene yields with the diazo compound of:

| | Shades |
|---|---|
| 4-benzoyl-amino-3-methyl-6-methoxy-1-amino-benzene | Dark brown |
| 4-chloro-2-methyl-1-amino-benzene | Reddish brown |
| 5-chloro-2-phenoxy-1-amino-benzene | Reddish brown |
| 2-nitro-4-methyl-1-amino-benzene | Brownish black |
| 4-nitro-3-methyl-1-amino-benzene | Blackish brown |
| 2-nitro-4-methoxy-1-amino-benzene | Olive brown |
| 3,2'-dimethyl-4-amino-azo-benzene | Blackish brown |
| 4,4'-diamino-3,3'-dimethoxy-diphenyl (½ molecular proportion) | Blackish brown |

1-(4-hydroxy-1,2-dimethyl-benzene-5-carbonyl) amino-4-methoxy-naphthalene yields with the diazo compound of:

| | Shades |
|---|---|
| 2,5-dichloro-1-amino-benzene | Brown |
| 2-nitro-4-methyl-1-amino-benzene | Blackish brown |
| 4-nitro-2-methoxy-1-amion-benzene | Brownish black |

2-(4-hydroxy-1,2-dimethyl-benzene-5-carbonyl) amino-1-methyl-naphthalene yields with the diazo compound of:

| | Shades |
|---|---|
| 2,5-dichloro-1-amino-benzene | Brown |
| 3,2'-dimethyl-4-amino-azo-benzene | Blackish brown |

1-(4-hydroxy-1,2-dimethyl-benzene-5-carbonyl) amino-5-chloro-naphthalene yields with the diazo compound of:

| | Shades |
|---|---|
| 2,5-dichloro-1-amino-benzene | Brown |
| 5-chloro-2-phenoxy-1-amino-benzene | Reddish brown |
| 4-nitro-2-methyl-1-amino-benzene | Blackish brown |

1-(4-hydroxy-1,2-dimethyl-benzene-5-carbonyl) amino-5-nitro-naphthalene yields with the diazo compound of:

| | Shades |
|---|---|
| 2,5-dichloro-1-amino-benzene | Brown |
| 4-nitro-2-methyl-1-amino-benzene | Blackish brown |

1,5-di-(4-hydroxy-1,2-dimethyl-benzene-5-carbonyl-amino)-naphthalene yields with two molecular proportions of the diazo compound of:

| | Shades |
|---|---|
| 2,5-dichloro-1-amino-benzene | Full brown |
| 5-chlor-2-phenoxy-1-amino-benzene | Dark reddish brown |
| 4-nitro-2-methoxy-1-amino-benzene | Brownish black |

1,4-di-(4-hydroxy-1,2-dimethyl-benzene-5-carbonyl-amino) benzene-yields with two molecular proportions of the diazo compound of:

| | Shades |
|---|---|
| 2,5-dichloro-1-amino-benzene | Reddish brown |
| 4-chloro-2-methyl-1-amino-benzene | Reddish brown |
| 5-nitro-2-methoxy-1-amino-benzene | Dark reddish brown |
| 1-amino-anthraquinone | Dark brown |

4,4'-di-(4-hydroxy-1,2-dimethyl-benzene-5-carbonyl-amino) 3,3'-dimethoxy-diphenyl yields with two molecular proportions of the diazo compound of:

| | Shades |
|---|---|
| 3-chloro-1-amino-benzene | Yellowish brown |
| 2,5-dichloro-1-amino-benzene | Brown |
| 2,4,5-trichloro-1-amino-benzene | Yellowish brown |
| 5-chloro-2-phenoxy-1-amino-benzene | Brown |
| 2,5-dichloro-4-methyl-1-amino-benzene | Yellowish brown |
| 4-chloro-2-nitro-1-amino-benzene | Dark brown |

*Example 5*

Well boiled and dried cotton yarn is impregnated with a solution containing per liter 20 grs. of (4-hydroxy-1-chloro-2-methyl-benzene-5-carbonyl) amino-benzene, 30 cc. of caustic soda solution of 34° Bé. and 30 cc. of Turkey red oil and being mixed with 20 grs. of common salt. The goods are wrung out and developed with a solution containing per liter the diazo compound of 1.62 grs. of 2,5-dichloro-1-amino-benzene and being neutralized with sodium bicarbonate. Then they are rinsed and soaped at the boil.

In this manner a yellowish brown dyeing is obtained. The dyestuff thus produced on the fiber corresponds to the formula:

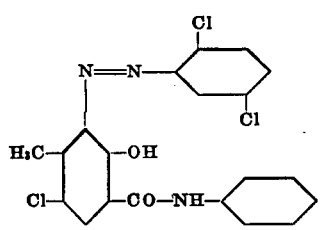

*Example 6*

Cotton goods, previously treated in the customary manner, are padded with a solution containing per liter 10 grs. of 1-(4-hydroxy-1-chloro-2-methyl-benzene-5-carbonyl) amino-2-methyl-4-chloro-benzene, 20 cc. of caustic soda solution of 34° Bé. and 20 cc. of Turkey red oil and being mixed with 20 grs. of common salt. The goods are dehydrated and developed in a solution containing per liter the diazo compound of 1.42 grs. of 5-chloro-2-methyl-1-amino-benzene. After finishing in the usual manner, a reddish brown dyeing of a good fastness to light is obtained. The dyestuff thus produced on the fiber corresponds to the formula:

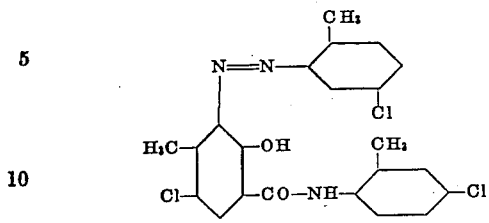

When the goods thus padded are developed with diazotized 2,5-dichloro-1-amino-benzene a brown dyeing, with 2,4,5-trichloro-1-amino-benzene a greyish brown dyeing, with 2-nitro-4-methyl-1-amino-benzene a brownish black, with 4-nitro-2-methoxy-1-amino-benzene likewise a brownish black dyeing is obtained.

By producing the dyestuffs on acetate silk the same arylamide yields with diazotized 1-amino-naphthalene a brown, with half the molecular proportion of tetrazotized 4-amino-benzene-azo-4'-amino-naphthalene a dark reddish brown, with 4,4'-diamino-3,3'-dimethoxy-diphenyl a yellowish brown dyeing.

The same arylamide yields on wool with a diazo compound of 2,5-dichloro-4-methyl-1-amino-benzene a yellowish brown dyeing.

*Example 7*

Cotton yarn previously treated in a suitable manner is padded with a solution containing per liter 10 grs. of 1-(4-hydroxy-1-chloro-2-methyl-benzene-5-carbonyl) amino-naphthalene, 20 ccm. of caustic soda solution of 34° Bé. and 20 cc. of Turkey red oil and being mixed with 20 grs. of common salt. After being squeezed out, the goods are developed in a solution containing per liter the diazo compound of 2 grs. of 2,4,5-trichloro-1-amino-benzene and being neutralized with sodium bicarbonate. After finishing in the usual manner, a reddish brown dyeing is obtained. The dyestuff thus produced on the fiber corresponds to the formula:

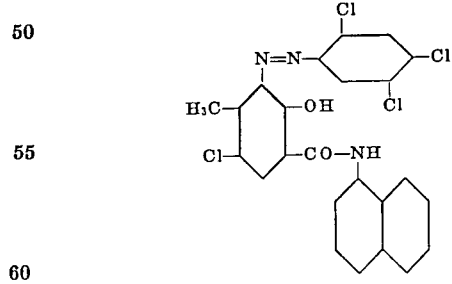

*Example 8*

Viscose is impregnated with a solution containing per liter 10 grs. of 1-(4-hydroxy-1-chloro-2 - methyl-benzene - 5 - carbonyl) amino-2-methoxy-4-chloro-benzene, 20 cc. of caustic soda solution of 34° Bé. and 20 cc. of Turkey red oil with a gradual addition of 10 grs. of common salt. After half an hour the goods are well centrifuged and developed with a solution containing per liter the diazo compound of 1.4 grs. of 2-nitro-1-amino-benzene and being neutralized with sodium acetate. After rinsing and soaping, a blackish violet dyeing is obtained. The dye-stuff thus produced on the fiber corresponds to the formula:

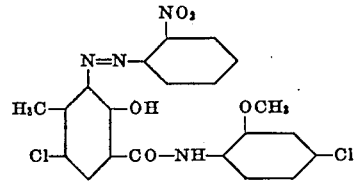

The same aryl-amide yields with the diazo compound of 4-chloro-2-nitro-1-amino-benzene a dark brown dyeing.

The following table shows the shades of some other combinations of this kind:

1-(4-hydroxy-1-chloro - 2 - methyl-benzene - 5 - carbonyl) amino-4-chloro-benzene, yields with the diazo compound of:

| | Shades |
|---|---|
| 2,5-dichloro-1-amino-benzene | Reddish brown |
| 2-nitro-1-amino-benzene | Brownish violet |
| 4-chloro-2-nitro-1-amino-benzene | Brown |
| 2,5-dichloro-4-methyl-1-amino-benzene | Reddish brown |

1-(4-hydroxy-1-chloro-2-methyl-benzene-5-carbonyl) amino-2-methoxy-4-chloro-benzene yields with the diazo compound of:

| | Shades |
|---|---|
| 2,5-dichloro-1-amino-benzene | Yellowish brown |
| 5-chloro-2-methyl-1-amino-benzene | Brown |
| 2-nitro-4-methyl-1-amino-benzene | Puce brown |
| 4-nitro-2-methoxy-1-amino-benzene | Blackish brown |
| 5-chloro-2-phenoxy-1-amino-benzene | Brown |
| 2,5-dichloro-4-methyl-1-amino-benzene | Orange brown |
| 2,4,5-trichloro-1-amino-benzene | Yellowish brown |

1,4-di-(4-hydroxy-1-chloro-2-methyl-benzene-5-carbonyl-amino) benzene yields with two molecular proportions of the diazo compound of:

| | Shades |
|---|---|
| 2,5-dichloro-1-amino-benzene | Full brown |
| 2,4,5-trichloro-1-amino-benzene | Yellowish brown |
| 5-chloro-2-phenoxy-1-amino-benzene | Dark brown |
| 3,2'-dimethyl-4-amino-azo-benzene | Olive brown |
| 4-nitro-2-methoxy-1-amino-benzene | Greyish brown |
| 1-amino-anthraquinone | Violet brown |

1,4-di-(4-hydroxy-1-chloro-2-methyl-benzene-5-carbonyl-amino) 2-methyl - 5 - methoxy-benzene yields with two molecular proportions of the diazo compound of:

| | Shades |
|---|---|
| 2,5-dichloro-1-amino-benzene | Dark brown |
| 2,4,5-trichloro-1-amino-benzene | Yellowish brown |
| 5-chloro-2-methyl-1-amino-benzene | Reddish brown |
| 2-amino-4-chloro-diphenyl-ether | Dark brown |
| 2-nitro-4-methyl-1-amino-benzene | Brown |
| 3,2'-dimethyl-4-amino-azo-benzene | Olive brown |

1,5 - di-(4-hydroxy-1-chloro-2-methyl-benzene-5-carbonyl-amino)-naphthalene yields with two molecular proportions of the diazo compound of:

| | Shades |
|---|---|
| 2,5-dichloro-1-amino-benzene | Dark brown |
| 5-chloro-2-phenoxy-1-amino-benzene | Dark brown |

1,4-di-(4-hydroxy-1-chloro-2-methyl - benzene-5-carbonyl-amino)-2-methoxy-5-chloro-benzene yields with two molecular proportions of the diazo compound of:

| | Shades |
|---|---|
| 2,4,5-trichloro-1-amino-benzene | Yellowish brown |
| 2-nitro-4-methyl-1-amino-benzene | Dark brown |
| 4-nitro-2-methoxy-1-amino-benzene | Blackish brown |
| 3,2'-dimethyl-4-amino-azo-benzene | Olive brown |

1,4-di-(4-hydroxy-1-chloro-2-methyl-benzene-5-carbonyl-amino) - 2,5-dimethyl-benzene yields with two molecular proportions of the diazo compound of:

| | Shades |
|---|---|
| 2,5-dichloro-1-amino-benzene | Reddish brown |
| 2,4,5-trichloro-1-amino-benzene | Yellowish brown |
| 5-chloro-2-phenoxy-1-amino-benzene | Dark brown |
| 4-nitro-2-methoxy-1-amino-benzene | Blackish brown |

Example 9

Well boiled and dried cotton yarn is impregnated with a solution containing per liter 10 grs. of 1-(4-hydroxy-2-chloro-1-methyl-benzene-5-carbonyl) amino-2-methyl-4-chloro-benzene, 20 cc. of caustic soda solution of 34° Bé. and 20 cc. of Turkey red oil with the addition of 20 grs. of common salt. The goods are well wrung out and developed with the solution containing per liter the diazo compound of 1.62 grs. of 2,5-dichloro-1-amino-benzene and being neutralized with sodium bicarbonate. After rinsing and soaping at the boil a full brown dyeing of a good fastness to light is obtained. The dyestuff thus produced on the fiber corresponds to the formula:

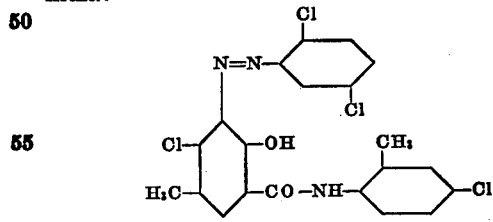

The same arylamide yields with the diazo compound of 5-chloro-2-methyl-1-amino-benzene a reddish brown dyeing.

Example 10

Cotton yarn, previously treated in a suitable manner, is impregnated with a solution containing per liter 10 grs. of 1,4-di-(4-hydroxy-2-chloro-1-methyl - benzene- 5 -carbonyl - amino)-2,5-dimethyl-benzene, 20 cc. of caustic soda solution of 34° Bé. and 20 cc. Turkey red oil. Then the goods are well dehydrated and developed in a solution containing per liter the diazo compound of 2.2 grs. 5-chloro-2-phenoxy-1-amino-benzene and being neutralized with sodium bicarbonate. After rinsing and soaping at the boil a dark brown dyeing of a very good fastness to light is obtained. The dyestuff thus produced on the fiber corresponds to the formula:

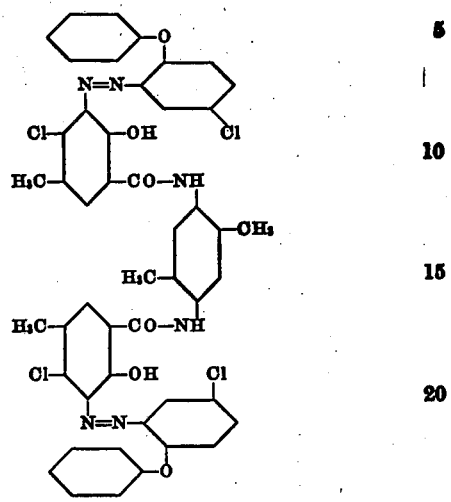

The same arylamide yields with the diazo compound of 2,5-dichloro-1-amino-benzene a dark brown, with that of 4-nitro-2-methoxy-1-amino-benzene or 3,2'-dimethyl-4-amino-azo-benzene blackish brown dyeings.

Example 11

Acetate silk is impregnated with a solution containing per liter 1.5 grs. of 4-amino-benzene-azo-4'-amino-naphthalene, 3 cc. of hydrochloric acid of 20° Bé. and 10 grs. of sodium acetate. After rinsing the goods are treated in the customary manner in a bath of nitrite and hydrochloric acid. Thereafter they are again rinsed and developed with a solution containing per liter 2 grs. of 1-(4-hydroxy-2-chloro-1-methyl-benzene-5-carbonyl) amino - 2 - methyl-4-chloro-benzene and 2 cc. of caustic soda solution of 34° Bé.

In this manner a dark reddish brown dyeing is obtained. The dyestuff thus produced on the fiber corresponds to the formula:

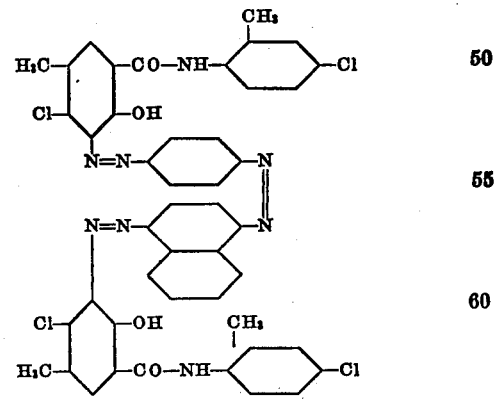

By replacing the diazo component by that of 1-amino-naphthalene a brown dyeing, by that of 4,4'-diamino-3,3'-dimethoxy-diphenyl a yellowish brown dyeing is obtained.

Example 12

Viscose is impregnated in a bath containing per liter 10 grs. of 1-(4-hydroxy-2-chloro-1-methyl-benzene-5-carbonyl) amino - 2 - methyl-4-chloro-benzene, 20 cc. of a caustic soda solution of 34° Bé. and 20 cc. of Turkey red oil for half an hour with the gradual addition of 10 grs. of common salt. Then the goods are well centrifuged and developed in a solution containing per liter the diazo compound of 1.7 grs. of 4-nitro-2-methoxy-1-amino-benzene and being freed from its excess of mineral acid by the addition of sodium acetate. After rinsing and soaping a brownish black dyeing is obtained. The dyestuff thus produced on the fiber corresponds to the formula:

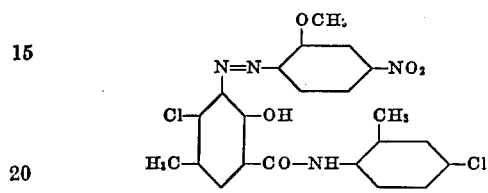

By replacing the diazo compound by that of 2,5-dichloro-4-methyl-1-amino-benzene a reddish brown dyestuff is produced.

The following table shows the shades of some other combinations of this kind:

(4-hydroxy-2-chloro-1-methyl- benzene - 5 - carbonyl) amino-benzene yields with the diazo compound of:

| | Shades |
|---|---|
| 2,5-dichloro-1-amino-benzene | Brown |
| 3,2'-dimethyl-4-amino-azo-benzene | Dark brown |

1-(4-hydroxy-2-chloro-1-methyl-benzene-5- carbonyl) amino-2,5-dimethoxy-benzene yields with the diazo compound of:

| | Shades |
|---|---|
| 2,5-dichloro-1-amino-benzene | Brown |
| 2,5-dichloro-4-methyl-1-amino-benzene | Yellowish brown |
| 4-chloro-2-nitro-1-amino-benzene | Brown |

2-(4-hydroxy-2-chloro-1-methyl-benzene-5- carbonyl) amino-naphthalene yields with the diazo compound of:

| | Shades |
|---|---|
| 2,5-dichloro-1-amino-benzene | Reddish brown |
| 4-chloro-2-nitro-1-amino-benzene | Brown |

1-(4-hydroxy-2-chloro-1-methyl-benzene-5-carbonyl) amino-2-methyl-4 -chloro - benzene yields with the diazo compound of:

| | Shades |
|---|---|
| 3-chloro-1-amino-benzene | Reddish brown |
| 2,4,5-trichloro-1-amino-benzene | Yellowish brown |
| 5-chloro-2-phenoxy-1-amino-benzene | Dark reddish brown |
| 2-nitro-4-methyl-1-amino-benzene | Blackish brown |

3-(4-hydroxy-2-chloro-1-methyl-benzene-5- carbonyl) amino-carbazole yields with the diazo compound of:

| | Shades |
|---|---|
| 5-chloro-2-phenoxy-1-amino-benzene | Yellowish brown |
| 3,2'-dimethyl-4-amino-azo-benzene | Brown |

1,4-di-(4-hydroxy-2-chloro-1-methyl-benzene-5-carbonyl-amino)-benzene yields with two molecular proportions of the diazo compound of:

| | Shades |
|---|---|
| 2,5-dichloro-1-amino-benzene | Brown |
| 2,4,5-trichloro-1-amino-benzene | Yellowish brown |
| 5-chloro-2-phenoxy-2-amino- benzene | Dark brown |
| 2-nitro-4-methyl-1-amino-benzene | Dark reddish brown |
| 3,2'-dimethyl-4-amino-azo-benzene | Brown |

1,4-di-(4-hydroxy-2-chloro-1-methyl-benzene-5-carbonyl-amino)-2- methyl - 5 - chloro - benzene yields with two molecular proportions of the diazo compound of:

| | Shades |
|---|---|
| 2,5-dichloro-1-amino-benzene | Brown |
| 2,4,5-trichloro-1-amino-benzene | Yellowish brown |
| 5-chloro-2-phenoxy-1-amino-benzene | Brown |
| 4-nitro-2-methoxy-1-amino-benzene | Dark brown |
| 3,2'-dimethyl-4-amino-azo-benzene | Olive brown |

1,4-di-(4-hydroxy-2-chloro-1-methyl-benzene-5-carbonyl- amino) 2,5 - dimethoxy - benzene yields with two molecular proportions of the diazo compound of:

| | Shades |
|---|---|
| 2,5-dichloro-1-amino-benzene | Yellowish brown |
| 5-chloro-2-phenoxy-1-amino-benzene | Brown |

1,4-di-(4-hydroxy-2-chloro-1 - methyl - benzene-5-carbonyl-amino) -2-methoxy-5-chloro- benzene yields with two molecular proportions of the diazo compound of:

| | Shades |
|---|---|
| 2,5-dichloro-1-amino-benzene | Brown |
| 5-chloro-2-methoxy-1-amino-benzene | Dark brown |
| 4-nitro-2-methoxy-1-amino-benzene | Blackish brown |
| 3,2'-dimethyl-4-amino-azo-benzene | Brown |

1,5-di-(4-hydroxy-2-chloro-1 - methyl - benzene-5-carbonyl-amino)-naphthalene yields with two molecular proportions of the diazo compound of:

| | Shades |
|---|---|
| 2,5-dichloro-1-amino-benzene | Brown |
| 5-chloro-2-phenoxy-1-amino-benzene | Brown |

3,6-di-(4-hydroxy-2-chloro-1-methyl-benzene-5-carbonyl-amino) -carbazole yields with two molecular proportions of the diazo compound of:

| | Shades |
|---|---|
| 3-chloro-1-amino-benzene | Brown |
| 2,4,5'-trichloro-1-amino-benzene | Brown |
| 1-amino-anthraquinone | Reddish brown |
| 4'-nitro-2,5-dimethoxy-4-amino-azo-benzene | Dark brown |

We claim:

1. The azo dyestuffs containing arylamides of the formula:

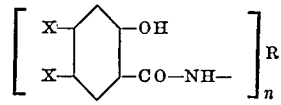

wherein the X's means methyl groups one of which may be replaced by a chlorine atom, $n$ means the number 1 or 2 and R a benzene, naphthalene, diphenyl or carbazole nucleus which may be substituted by alkyl, alkoxy, halogen or nitro groups, attached by means of azo groups to the aromatic nuclei of the group consisting of benzene, naphthalene, anthraquinone, which may contain as substituents alkyl, alkoxy, phenoxy, halogen, nitro-groups, a phenylazo- or naphthylazo-group, which compounds are insoluble in water and yield when produced on fibers brownish to black dyeings.

2. The azo dyestuffs of the general formula:

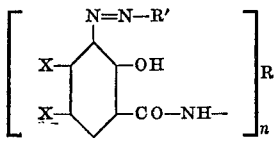

wherein the X's mean methyl groups one of which may be replaced by a chlorine atom, $n$ means the number 1 or 2, R a benzene, naphthalene, diphenyl or carbazole nucleus which may be substituted by alkyl, alkoxy, halogen or nitro-groups and R' means a benzene nucleus which may contain alkyl, alkoxy, phenoxy, halogen, nitro-groups, a phenylazo- or naphthylazo-group, which compounds are insoluble in water and yield when produced on fibers brownish dyeings.

3. The azo-dyestuffs corresponding to the general formula:

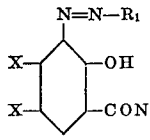

wherein $R_1$ stands for the radical of any aromatic diazo compound, both X's stand for methyl or one for methyl and the other for chlorine, and $R_2$ for any aromatic radical of the benzene, naphthalene, diphenyl or carbazole series which products, in a dry state, are yellow-brown to dark colored powders which dye the fiber fast yellow, orange, brown and dark brown tints.

4. The azo-dyestuffs which correspond to the general formula:

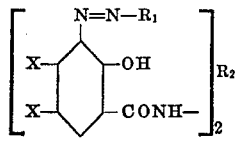

wherein the two $R_1$'s stand for the radical of any aromatic diazo compound, both X's stand for methyl or one for methyl and the other for chlorine, and $R_2$ for any aromatic radical of the benzene, naphthalene, diphenyl or carbazole series, which products in a dry state, are dark brown powders and, when produced on the fiber, dye the same brown tints which are intensive.

5. The azo-dyestuffs which correspond to the general formula:

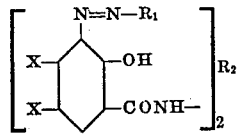

wherein the two $R_1$'s stand for the radical of a diazotized ortho-aminodiphenylether which is halogenated in the nucleus containing an amino group, both X's stand for methyl or one for methyl and the other for chlorine, and $R_2$ for any aromatic radical of the benzene, naphthalene, diphenyl or carbazole series, which products, in a dry state, are dark brown powders and, when produced on the fiber, dye the same brown tints which are intensive.

6. The azo dyestuff of the formula:

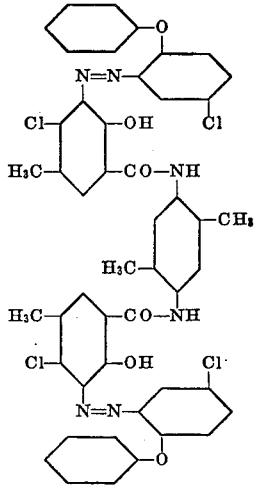

which compound is insoluble in water and yields when produced on fibers dark brown dyeings.

7. The azo dyestuff of the formula:

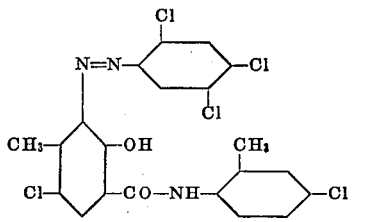

which compound is insoluble in water and yields when produced on fibers greyish brown dyeings.

8. The azo dyestuff of the formula:

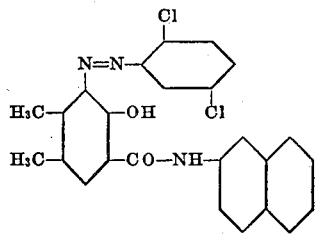

which compound is insoluble in water and yields when produced on fibers brown dyeings.

9. Fiber dyed with the azo dyestuffs as claimed in claim 1.

10. Fiber dyed with the azo dyestuffs as claimed in claim 2.

11. Fiber dyed with the azo dyestuff as claimed in claim 6.

12. Fiber dyed with the azo dyestuff as claimed in claim 7.

13. Fiber dyed with the azo dyestuff as claimed in claim 8.

LEOPOLD LASKA.
ARTHUR ZITSCHER.